//(12) United States Patent
Lemoff et al.

(10) Patent No.: US 7,050,719 B2
(45) Date of Patent: May 23, 2006

(54) WAVELENGTH DIVISION MULTIPLEXING RECEIVER FOR WAVELENGTH TRACKING

(76) Inventors: Brian E. Lemoff, 3500 Deer Creek Rd., M/S 26M-9, Palo Alto, CA (US) 94304; Frank H. Peters, 1170 Wilhelmina Way, San Jose, CA (US) 95120

( * ) Notice: Subject to any disclaimer, the term of this patent is extended or adjusted under 35 U.S.C. 154(b) by 702 days.

(21) Appl. No.: 10/223,780

(22) Filed: Aug. 19, 2002

(65) Prior Publication Data

US 2004/0208582 A1 Oct. 21, 2004

(51) Int. Cl.
*H04J 14/02* (2006.01)

(52) U.S. Cl. .............................. 398/79; 398/75; 398/82; 398/84; 398/85; 398/91; 398/94; 398/147; 398/141; 398/158; 398/159; 398/153; 398/202; 398/208; 398/214; 385/24; 385/37; 356/450; 356/477; 356/451

(58) Field of Classification Search .................. 398/79, 398/75, 98, 82, 84, 91, 94, 147, 158, 85, 398/141, 159, 153, 202, 208, 214; 385/24, 385/37; 356/450, 477, 451

See application file for complete search history.

(56) References Cited

U.S. PATENT DOCUMENTS 6,452,681 B1 * 9/2002 Carver et al. ............... 356/450
2003/0123878 A1 * 7/2003 Li et al. ........................ 398/79

* cited by examiner

*Primary Examiner*—Hanh Phan (57) ABSTRACT

The WDM receiver includes a wavelength demultiplexer, a detector array and a signal extractor. The wavelength demultiplexer receives an n-channel optical input signal and transmits the n-channel optical input signal to m optical outputs. Each of the optical outputs receives a wavelength band centered at a different wavelength. The wavelength bands have a center-to-center wavelength spacing of $\Delta\lambda'$. The detector array is composed of m detector elements coupled to the wavelength demultiplexer. Each of the detector elements generates a detection signal in response to light received from one of the optical outputs of the wavelength demultiplexer. The signal extractor receives the detection signals from the detector array and converts the detection signals to an n-channel receiver output signal, each channel of which corresponds to a different one of the n channels of the optical input signal. The WDM receiver is able to detect optical signals that are closely spaced in wavelength, even when the optical signals have off-center of varying wavelengths.

21 Claims, 6 Drawing Sheets

WAVELENGTH DIVISION MULTIPLEXING RECEIVER FOR WAVELENGTH TRACKING

FIELD OF THE INVENTION

The invention relates generally to wavelength division multiplexing (WDM) receivers, and more particularly, to a wavelength division multiplexing (WDM) receiver for wavelength tracking.

BACKGROUND OF THE INVENTION

Optical communication systems provide an important way for transferring large amounts of data and other signals at high speeds. An important component in these optical communication systems is an optical transceiver. On the transmission side, the optical transceiver functions to translate an electrical signal representing an information signal (e.g., a digital information signal in the form of 1s and 0s) into an optical signal suitable for transmission via a transmission medium (e.g., an optical fiber). On the reception side, the optical transceiver converts the received optical signal back into an electrical signal that represents the original information signal. An important component in the optical transceiver design is the transmitter for transmitting the optical signal. Typically, the transmitter incorporates a light emitting diode (LED) for transmission rates of the order of megabits/second and a semiconductor laser diode for transmission rates of the order of gigabits/second.

High Speed Design Considerations

As the demand for bandwidth in optical communication systems ever increases, new design considerations and mechanisms are required to achieve higher transmission speeds. Wavelength division multiplexing (WDM) has provided an increased bandwidth through optical fiber. Wavelength division multiplexing (WDM) sends many high-speed optical signals at different wavelengths through the same optical fiber to increase the total bandwidth of the system. Since only a finite portion of the spectral bandwidth of current optical fiber can be used to transmit optical signals, the bandwidth required for each channel limits the number of channels that can be supported by a WDM system.

Current wavelength division multiplexing (WDM) systems are based on two main approaches. One approach uses laser sources that are not temperature controlled. An example of this approach is described by Lemoff, B. E.; Buckman, L. A.; Schmit, A. J.; Dolfi, D. W in *A Compact, Low-Cost WDM Transceiver For The LAN*, PROCEEDINGS 50$^{TH}$ ELECTRONIC COMPONENTS AND TECHNOLOGY CONFERENCE, 711–716 (2000). However, in this first approach each channel generally requires about 15 nm of bandwidth. A large bandwidth is required since each channel must be able to accommodate optical signals that have a wavelength that depends generally on the temperature of the laser source. As can be appreciated, the number of channels that can be employed in a WDM system is reduced as the bandwidth for each channel is increased.

A second approach utilizes temperature-controlled laser sources. An example of this approach is described in U.S. Pat. No. 4,993,032 entitled, *Monolithic Temperature Stabilized Optical Tuning Circuit For Channel Separation In WDM Systems Utilizing Tunable Lasers*. Using temperature-controlled laser sources reduces the bandwidth requirements for each channel to a few nanometers. Since the temperature of the laser source is well controlled in these systems, the bandwidth required for each channel is significantly less than the first approach. Consequently, the number of channels that can be supported in these systems is greater than the first approach. These systems are commonly referred to as "dense" WDM (DWDM) systems. Unfortunately, using temperature-controlled laser sources increases the complexity of the transmitter and is expensive to implement.

Accordingly, there is a tradeoff in prior art systems between the number of channels that are supported by a system and the cost of the system attributed to temperature control of the laser.

The prior art approaches do not provide any mechanisms that allow the channel spacing of WDM systems to be reduced without the use of temperature-controlled laser sources. Consequently, what is needed is a WDM receiver that would allow the channel spacing of WDM systems to be reduced without the requiring the use of temperature-controlled laser sources in the transmitter.

SUMMARY OF THE INVENTION

The invention provides a wavelength division multiplexing (WDM) receiver for an n-channel optical input signal whose channels have a channel spacing of $\Delta\lambda$. The WDM receiver includes a wavelength demultiplexer, a detector array and a signal extractor. The wavelength demultiplexer receives the n-channel optical input signal and transmits the n-channel optical input signal to m optical outputs. Each of the optical outputs receives a wavelength band centered at a different wavelength. The wavelength bands have a center-to-center wavelength spacing of $\Delta\lambda'$. The detector array is composed of m detector elements coupled to the wavelength demultiplexer. Each of the detector elements generates a detection signal in response to light received from one of the optical outputs of the wavelength demultiplexer. The signal extractor receives the detection signals from the detector array and converts the detection signals to an n-channel receiver output signal, each channel of which corresponds to a different one of the n channels of the optical input signal.

The WDM receiver generates more detection signals than the number of channels in the optical input signal. This enables the WDM receiver to detect the optical signals that constitute the optical input signal, even when the optical signals are generated by sources whose wavelengths are offset from the center wavelengths of their respective channels and/or vary with time. Such a source may be a laser that is not temperature controlled, for example. In other words, the WDM receiver is able to detect optical signals that are closely spaced in wavelength, even when the optical signals have offset or varying wavelengths.

BRIEF DESCRIPTION OF THE DRAWINGS

The invention is illustrated by way of example, and not by way of limitation, in the figures of the accompanying drawings and in which like reference numerals refer to similar elements.

DETAILED DESCRIPTION OF THE INVENTION

Embodiments of a wavelength division multiplexing (WDM) receiver are disclosed. In the following description, for the purposes of explanation, numerous specific details are set forth in order to provide a thorough understanding of the invention. It will be apparent, however, to one skilled in the art that the invention may be practiced without these specific details. In other instances, well-known structures and devices are shown in block diagram form in order to avoid unnecessarily obscuring the invention.

The WDM receiver of the invention may be used in applications in which the wavelengths of the optical signals that constitute the WDM optical input signal vary over time or that are offset from the nominal center wavelength of the channel assigned to the optical signal. In other words, the WDM receiver of the invention is able to detect WDM optical signals that are closely spaced in wavelength, even when the wavelengths of the signals vary over time or are offset from their channel center wavelengths. The WDM receiver of the invention tracks the wavelength variations of the WDM optical input signal.

WDM Receiver According to a First Embodiment

Figure 1:
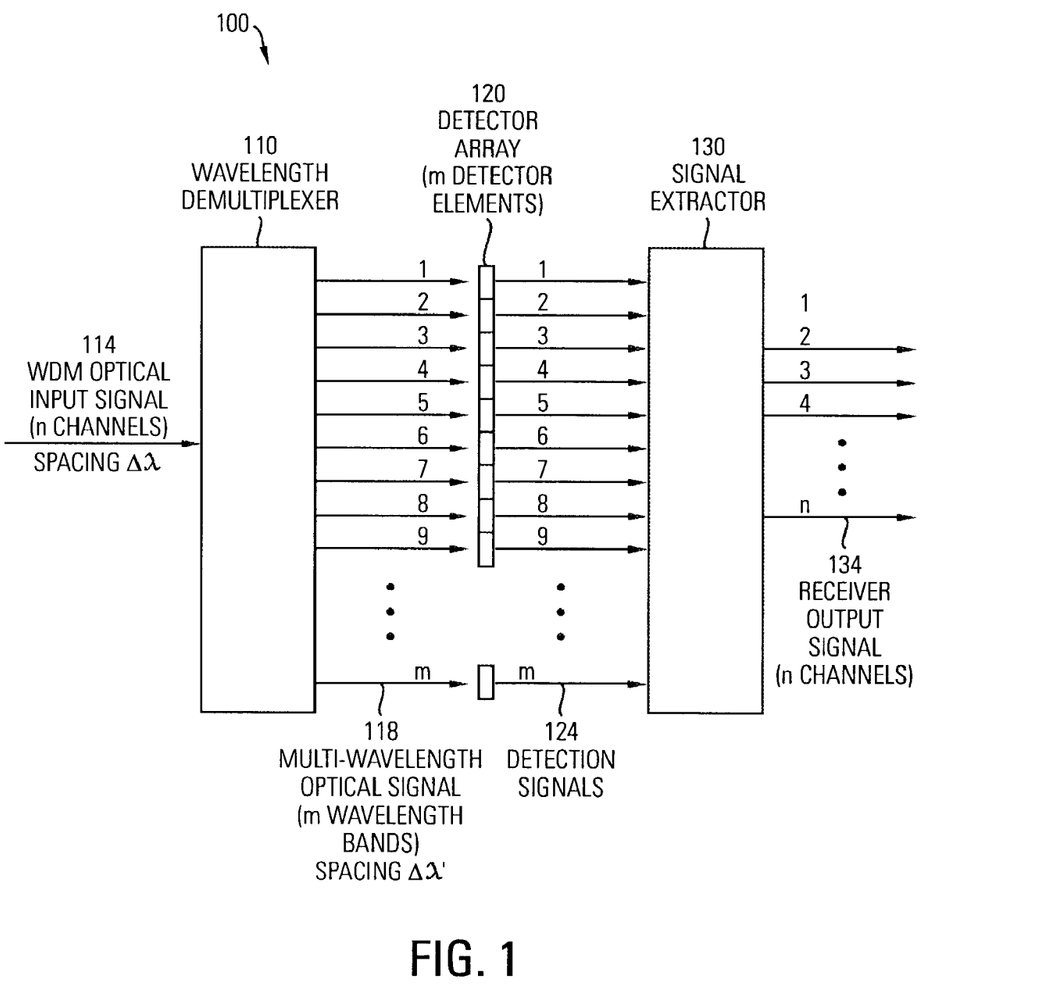
FIG. 1 is a block diagram illustrating a first embodiment of a WDM receiver according to the invention.

FIG. 1 is a block diagram illustrating a first embodiment 100 of a wavelength division multiplexing (WDM) receiver 100 according to the invention. The WDM receiver 100 includes a wavelength demultiplexer 110 for receiving WDM optical input signal 114. The wavelength demultiplexer 110 generates a multi-wavelength optical signal 118 from the WDM optical input signal.

The WDM optical input signal 114 is an n-channel optical signal. Each channel has a center wavelength and adjacent channels are separated in wavelength by a channel spacing of delta lambda ($\Delta\lambda$). Optical signals having mutually different wavelengths are assigned to the channels of the WDM optical input signal. There is no requirement or implication that, at a given time, an optical signal be present in every channel of the WDM optical input signal. Moreover, the wavelengths of one or more of the optical signals may be offset from the center wavelengths of the channels to which the optical signals are assigned. Additionally, the wavelengths of one or more of the optical signals may vary with time.

The multi-wavelength optical signal 118 is an optical signal composed of a number m of wavelength bands greater than or equal to the number of channels n in optical input signal 114, i.e., $m \geq n$. The wavelength bands have a wavelength spacing of delta lambda prime ($\Delta\lambda'$). The wavelength demultiplexer 110 generates the multi-wavelength optical signal by transmitting the WDM optical input signal to m demultiplexer outputs. Each of the demultiplexer outputs receives a wavelength band centered on a different wavelength. The wavelength bands have a center-to-center wavelength spacing of $\Delta\lambda'$.

The WDM receiver 100 also a includes a detector array 120 composed of m detector elements that are optically coupled to the m outputs of the first wavelength demultiplexer 110 to receive the multi-wavelength optical signal 118. The detector elements generate m detection signals 124 in response to the multi-wavelength optical signal. For example, each detector element can generate a photocurrent in response to light received from a corresponding one of the demultiplexer outputs of the wavelength demultiplexer 110.

The WDM receiver 100 also includes a signal extractor 130 for receiving the m detection signals 124 from the m detector elements of the detector array 120. Responsive to the detection signals, the signal extractor generates n-channel receiver output signal 134. For example, the signal extractor 130 converts the photocurrents generated by the m detector elements to the n-channel receiver output signal, where each channel of the receiver output signal corresponds to one of the n channels of the WDM optical input signal. The mapping algorithm performed by the signal extractor 130 to determine which of the detection signals each channel of the receiver output signal is generated from is described in greater detail below with reference to FIGS. 3 and 4.

The invention detects optical signals that constitute the WDM optical input signal 114 using the detector array 120 composed of more detector elements than the number of channels of the WDM optical input signal. The detector elements that exceed the number of channels can be regarded as redundant detector elements. The redundant detector elements provide signals that are used by the signal extractor 130 of the WDM receiver to detect the optical signals, even when the optical signals are generated by sources whose wavelengths are offset from the channel center wavelength and/or vary with time. Such optical signals can be generated by laser sources that are not temperature controlled, for example. Specifically, the WDM receiver of the invention is able to distinguish between optical signals that are closely spaced in wavelength, even when the optical signals have wavelengths that are offset from the respective channel center wavelengths or vary with time or both.

Figure 2:
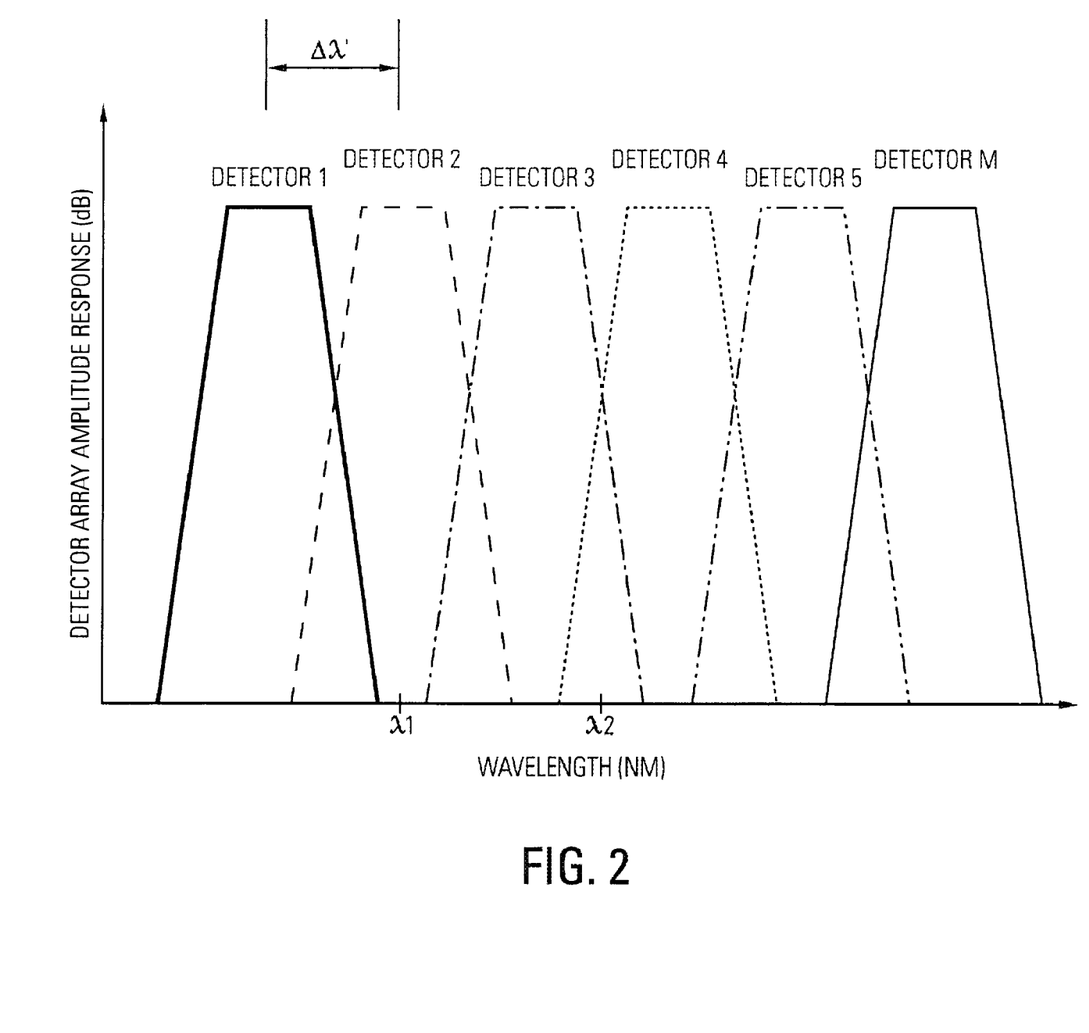
FIG. 2 is a graph illustrating the amplitude versus wavelength response of part of the detector array of the WDM receiver shown in FIG. 1.

FIG. 2 is a graph illustrating the amplitude response of detector elements constituting an exemplary set of the detector elements of the detector array 120 versus wavelength of the WDM optical input signal 114 according to one embodiment of the invention. This graph illustrates the detector element response to demultiplexer outputs 118. The detector elements have overlapping frequency responses, but at some wavelengths, (e.g. $\lambda 1$), only one detector element has a response. In the case of $\lambda 1$, only detector2 has a response. However, at other wavelengths (e.g. $\lambda 2$), two detector elements have a response. In the case of $\lambda 2$, both detector3 and detector4 have a response. FIG. 2 additionally shows $\Delta\lambda'$, the center-to-center wavelength spacing of the wavelength ranges output by the demultiplexer.

Mapping Algorithms for the WDM Receiver of the First Embodiment

Figure 3:
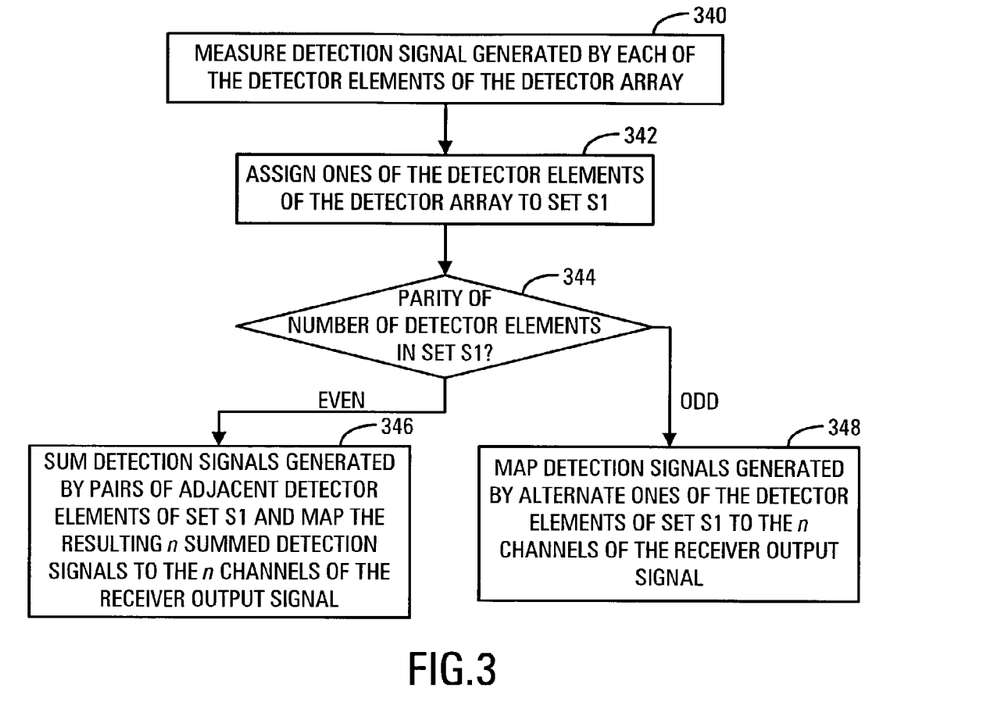
FIG. 3 is a flowchart that illustrates the signal extraction processing performed by a first example of the WDM receiver shown in FIG. 1.

FIG. 3 is a flowchart that illustrates the mapping algorithm performed by an example of the WDM receiver 100 shown in FIG. 1 in which the wavelength spacing $\Delta\lambda'$ of the demultiplexer 110 is one-half of the channel spacing $\Delta\lambda$ of the WDM optical input signal, i.e., $\Delta\lambda'=\Delta\lambda/2$. The mapping algorithm determines the relationship between the detection signals generated by the detector elements of the detector array 120 and the channels of the receiver output signal.

In block 340, the detection signals generated by the detector elements of the detector array 120 are measured.

For example, the DC component of the photocurrent generated by each of the detector elements may be measured. The DC component of the photocurrent represents the average optical power received by the detector element.

In block 342, ones of the detector elements of the detector array 120 that (a) generate respective detection signals commensurate with illumination, or that (b) do not generate respective detection signals commensurate with illumination, but are located in the detector array between two detector elements that generate respective detection signals commensurate with illumination are assigned to a set S1. A detector element that generates a detection signal that exceeds a predetermined level associated with noise may be regarded as a detector element that generates a detection signal commensurate with illumination. Other criteria may alternatively be used.

In block 344, the parity of the number of detector elements in set S1 is tested. The parity indicates whether the number of detector elements in the set is odd or even. When the parity of the number of detector elements in set S1 is even, processing proceeds directly to block 346. Otherwise, the parity of the number of detector elements is odd, and processing instead proceeds to block 348.

In block 346, the detection signals generated by pairs of adjacent detector elements 2i–1 and 2i (i=1 through n) of set S1 are summed and the resulting summed detection signals are mapped to the n channels of the receiver output signal. This results in a mapping in which each channel of the WDM optical input signal 114 is detected by two adjacent detector elements of the detector array 120.

In block 348, the detection signals generated by alternate ones of the detector elements of set S1 are mapped to the n channels of the receiver output signal. The mapping can start with the first detector element of the set. This results in a mapping in which each channel of the WDM optical input signal 114 is detected by a single detector element of the detector array 120.

Figure 4:
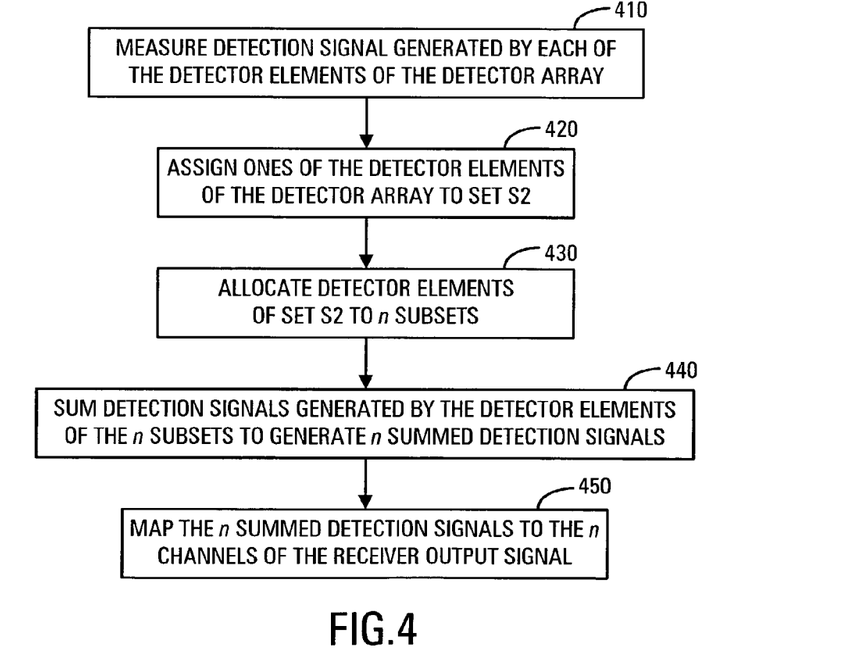
FIG. 4 is a flowchart that illustrates the signal extraction processing performed by a second example of the WDM receiver shown in FIG. 1.

FIG. 4 is a flowchart that illustrates the mapping algorithm performed by an example of the WDM receiver 100 of FIG. 1 in which the wavelength spacing $\Delta\lambda'$ of the demultiplexer 110 is one-third of the channel spacing $\Delta\lambda$ of the WDM optical input signal, i.e., $\Delta\lambda'=\Delta\lambda/3$.

In block 410, the detection signals generated by the detector elements of the detector array 120 are measured as described above with reference to block 340 of FIG. 3.

In block 420, ones of the detector elements of detector array 120 that generate respective detection signals commensurate with illumination are assigned to a set S2. Detector elements that generate respective detection signals commensurate with illumination are described above with reference to block 342 of FIG. 3.

In block 430, the detector elements of set S2 are allocated to n subsets in which each detector element of set S2 is present in no more than one of the subsets and each of the subsets contains one of the detector elements of set S2 and all of the detector elements of set S2, if any, that are adjacent to the one of the detector elements of set S2.

In block 440, the detection signals generated by the detector elements of the n subsets are summed to generate n summed detection signals.

In block 450, the n summed detection signals are mapped to the n channels, of the receiver output signal.

In an example of the WDM receiver 100 shown in FIG. 1 in which the wavelength spacing $\Delta\lambda'$ of the demultiplexer 110 is equal to the channel spacing $\Delta\lambda$ of the WDM optical input signal, i.e., $\Delta\lambda'=\Delta\lambda$, a single one of the detector elements of the detector array 120 may detect light from the optical signals in two different channels of the WDM optical input signal 114. This results in the detection signal output by such detector element representing a linear combination of the two optical signals, with each optical signal adding with a different amplitude and phase. To detect the information signals represented by the optical signals, the waveform of the detection signal generated by each detector element is converted to a digital signal using an analog-to-digital converter. Digital signal processing algorithms are then applied to the digital signals to generate receiver output signals that respectively represent the optical signals in the n channels of the WDM optical input signal.

WDM Receiver According to a Second Embodiment

Figure 5:
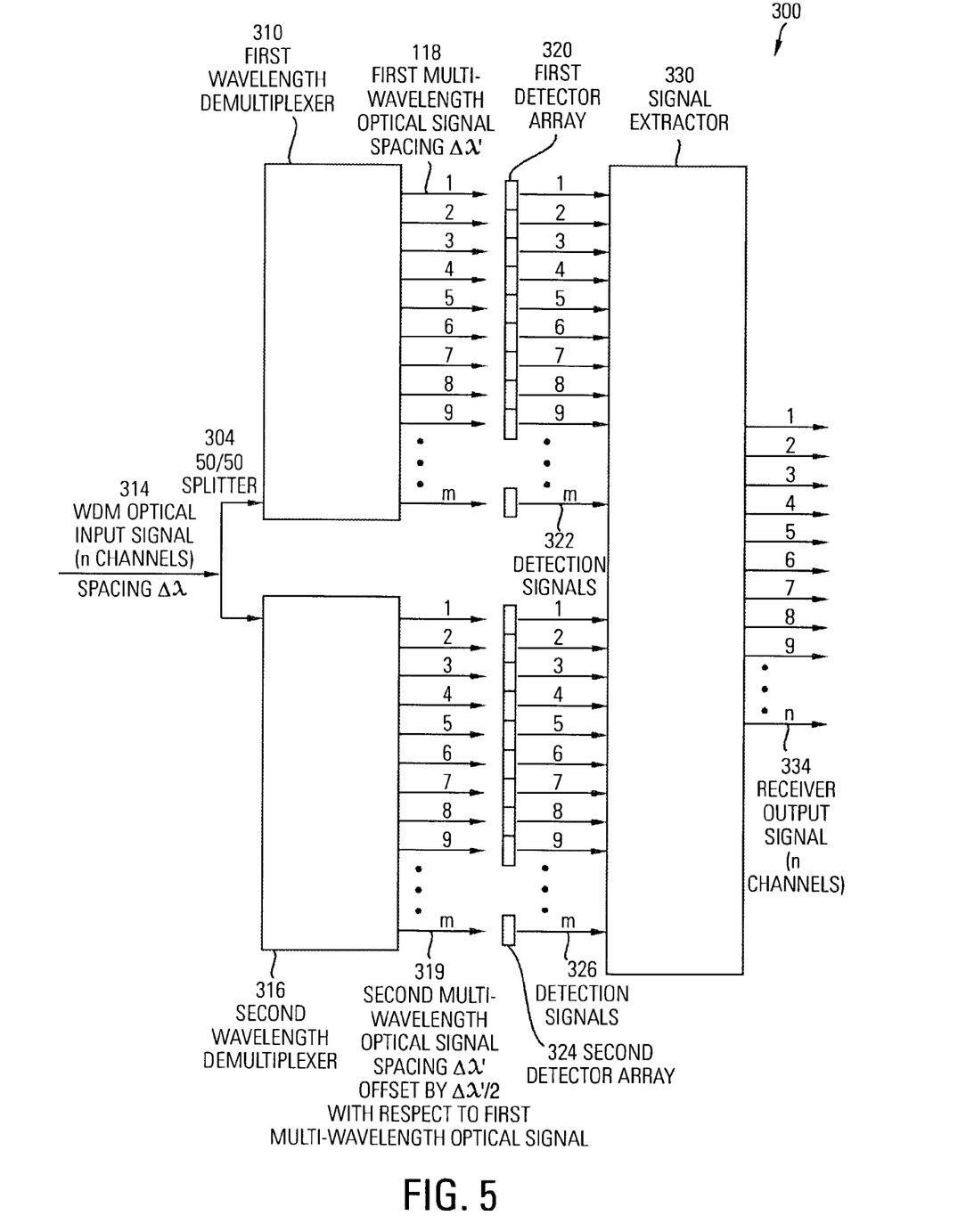
FIG. 5 is a block diagram illustrating a second embodiment of a WDM receiver according to the invention.

FIG. 5 is a block diagram illustrating a second embodiment 300 of a WDM receiver according to the invention. The WDM receiver 300 includes a splitter 304 for receiving WDM optical input signal 314 and for splitting the WDM optical input signal into two optical input signal components of substantially equal amplitude, e.g., a first optical signal component and a second optical signal component. The WDM optical input signal is an n-channel optical signal with a channel spacing of delta lambda ($\Delta\lambda$), as described above.

The WDM receiver 300 also includes a first wavelength demultiplexer 310 that is coupled to the splitter 304 to receive one of the optical input signal components, e.g., the first optical signal component. The first wavelength demultiplexer generates a first multi-wavelength optical signal 318 in response to the first optical signal component.

The first multi-wavelength optical signal 118 is an optical signal composed of a number m of wavelength bands greater than or equal to the number of channels n in the WDM optical input signal 114, i.e., m≧n. The wavelength bands have a wavelength spacing of delta lambda prime ($\Delta\lambda'$). The wavelength demultiplexer 310 generates the multi-wavelength optical signal by transmitting the first optical signal component to m demultiplexer outputs. Each of the demultiplexer outputs receives a wavelength band centered on a different wavelength. The wavelength ranges have a center-to-center wavelength spacing of $\Delta\lambda'$.

Figure 6:
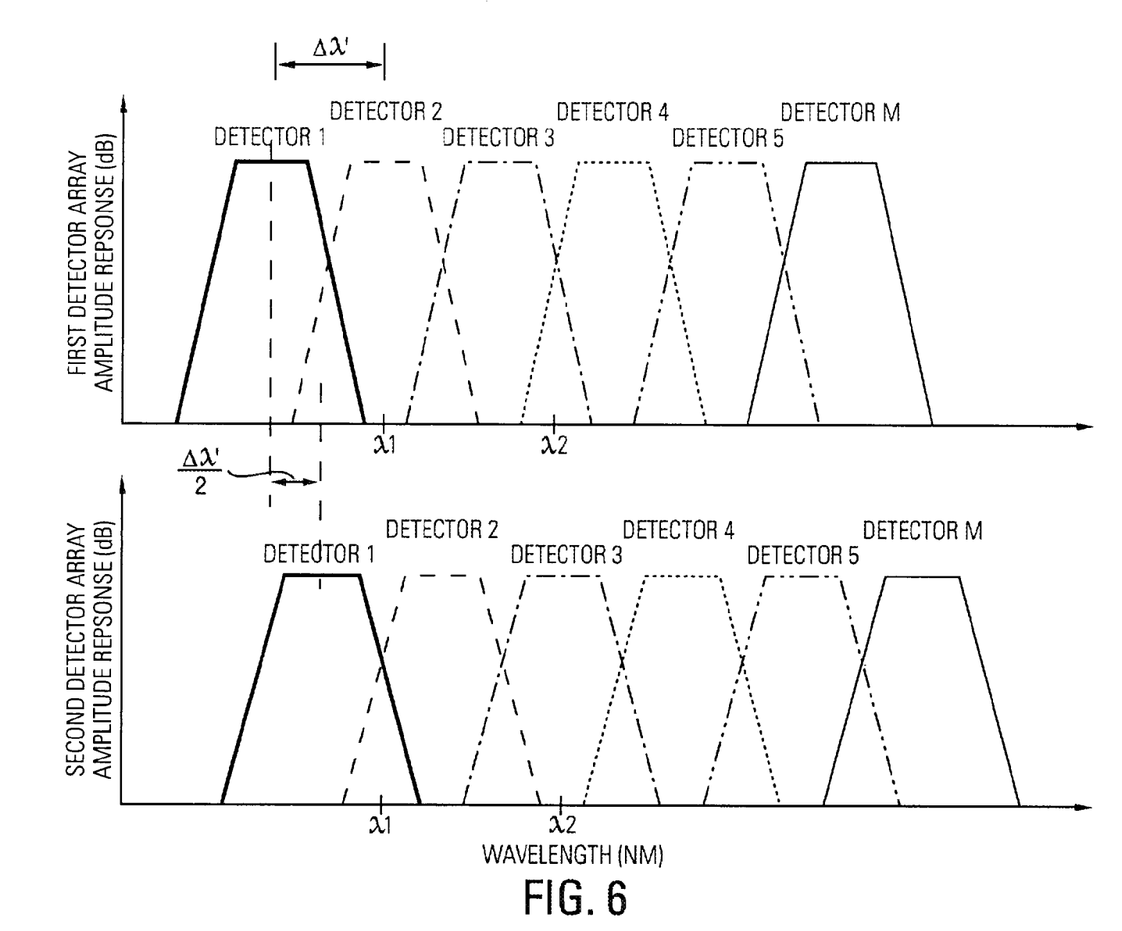
FIG. 6 is a graph illustrating the amplitude versus wavelength response of part of the detector arrays of the WDM receiver shown in FIG. 5.

The WDM receiver 300 also includes a second wavelength demultiplexer 316 that is coupled to the splitter 304 to receive the other of the optical input signal components, e.g., the second optical signal component. The second wavelength demultiplexer generates a second multi-wavelength signal 319 in response to the second optical signal component. The second multi-wavelength optical signal 319 is an optical signal having the same number m of wavelength bands as the first multi-wavelength optical signal 318. The wavelength bands have a wavelength spacing of delta lambda prime ($\Delta\lambda'$). The second wavelength demultiplexer 316 generates the second multi-wavelength optical signal by transmitting the second optical signal component to m demultiplexer outputs. Each of the demultiplexer outputs receives a wavelength band centered on a different wavelength. The wavelength bands have a center-to-center wavelength spacing of $\Delta\lambda'$ and are offset by a wavelength of ($\Delta\lambda'/2$) with respect to the wavelength bands of the corresponding outputs of the first wavelength demultiplexer 310. The ($\Delta\lambda'/2$) offset is shown in FIG. 6.

The WDM receiver 300 also includes a first detector array 320 composed of m detector elements for receiving the first multi-wavelength optical signal 318 from the first wavelength demultiplexer 310. The first detector array generates a first set 322 of m detection signals in response to the first multi-wavelength optical signal. For example, each detector element in the first detector element array 320 can generate a photocurrent in response to an optical signal received from a corresponding one of the demultiplexer outputs of the first wavelength demultiplexer 310.

The WDM receiver 300 also includes a second detector array 324 composed of m detector elements for receiving the second multi-wavelength optical signal 319 from the second wavelength demultiplexer 316. The second detector array generates a second set 324 of m detection signals in response to the second multi-wavelength optical signal. For example, each detector element in the second detector element array 324 can generate a photocurrent in response to an optical signal received from a corresponding one of the demultiplexer outputs of the second wavelength demultiplexer 316.

The WDM receiver 300 also includes a signal extractor 330 for receiving the detection signals from both the first detector array 320 and the second detector array 324. The signal extractor generates an n-channel receiver output signal 334 in response to the detection signals. The mapping algorithm performed by the signal extractor 330 to determine which of the detection signals each channel of the receiver output signal is generated from is described in greater detail below with reference to FIGS. 7 and 8.

FIG. 6 is a graph illustrating the amplitude response exemplary detector elements of the first detector array 320 and the second detector array 326 versus wavelength of the WDM optical input signal in an example of the WDM receiver 300. In the WDM receiver 300, the outputs of the first wavelength demultiplexer 310 and the second wavelength demultiplexer 316 are offset in wavelength by one-half of the wavelength spacing $\Delta\lambda'$ of the wavelength bands of the wavelength demultiplexers. This ensures that, in at least one of the detector arrays 320 and 324, an optical signal of any wavelength in the WDM optical input signal is detected by no more than one of the detector elements. In the example shown, an optical signal with wavelength $\lambda 1$ is detected by only one of the detector elements (detector2) in the first detector array and by two detector elements (detector1 and detector2) in the second detector array. In contrast, an optical signal with wavelength $\lambda 2$ is detected by one of the detector elements (detector3) in the second detector array and by two detectors (detector3 and detector4) in the first detector array.

Mapping Algorithms for WDM Receiver According to the Second Embodiment

Figure 7:
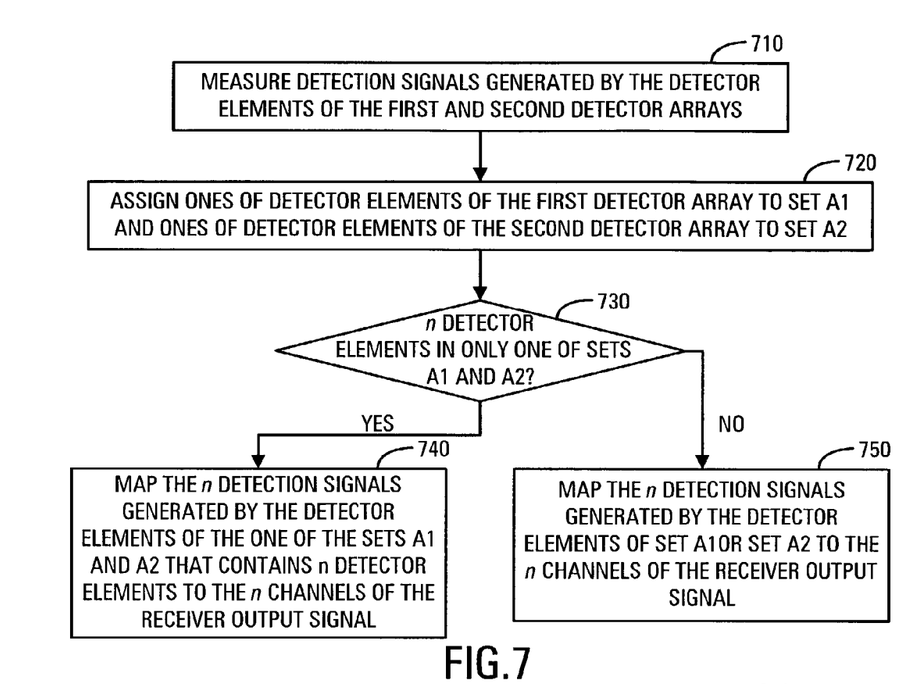
FIG. 7 is a flowchart that illustrates the signal extraction processing performed by a first example of the WDM receiver shown in FIG. 5.

FIG. 7 is a flowchart that illustrates the mapping algorithm performed by an example of the WDM receiver 300 shown in FIG. 5 in which the wavelength spacing $\Delta\lambda'$ of the wavelength demultiplexers 310 and 316 is equal to the channel spacing $\Delta\lambda$ of the WDM optical input signal 314, i.e., $\Delta\lambda'=\Delta\lambda$.

In block 710, the detection signals generated by the detector elements of the detector arrays 320 and 324 are measured as described above with reference to block 340 of FIG. 3.

In block 720, ones of the detector elements of the first detector array 320 that generate respective detection signals commensurate with illumination are assigned to a set A1 and ones of the detector elements of the second detector array 324 that generate respective detection signals commensurate with illumination are assigned to a set A2. Detector elements that generate respective detection signals commensurate with illumination are described above with reference to block 342 of FIG. 3.

In block 730, a test is performed to determine whether only one of the sets A1 and A2 contains n detector elements. When only one of the sets A1 and A2 contains n detector elements, processing proceeds to block 740. Otherwise, both of the sets contain n elements and processing instead proceeds to block 750. Alternatively, the test may determine whether both of sets A1 and A2 contain n detector elements. A test performed to determine whether only one of the sets A1 and A2 contains n detector elements will be regarded as encompassing this alternative.

In block 740, the n detection signals generated by the detector elements of the set A1 or A2 that contains n detector elements are mapped to the n channels of the receiver output signal 334.

In block 750, the n detection signals generated by the detector elements of set A1 or set A2 are mapped to the n channels of the receiver output signal 334. In one embodiment, the detection signals generated by the detector elements of set having the greater total detection signal power are mapped to the receiver output signal. The total signal power of a set may be determined by summing the detection signals generated by the detector elements of the set.

Figure 8:
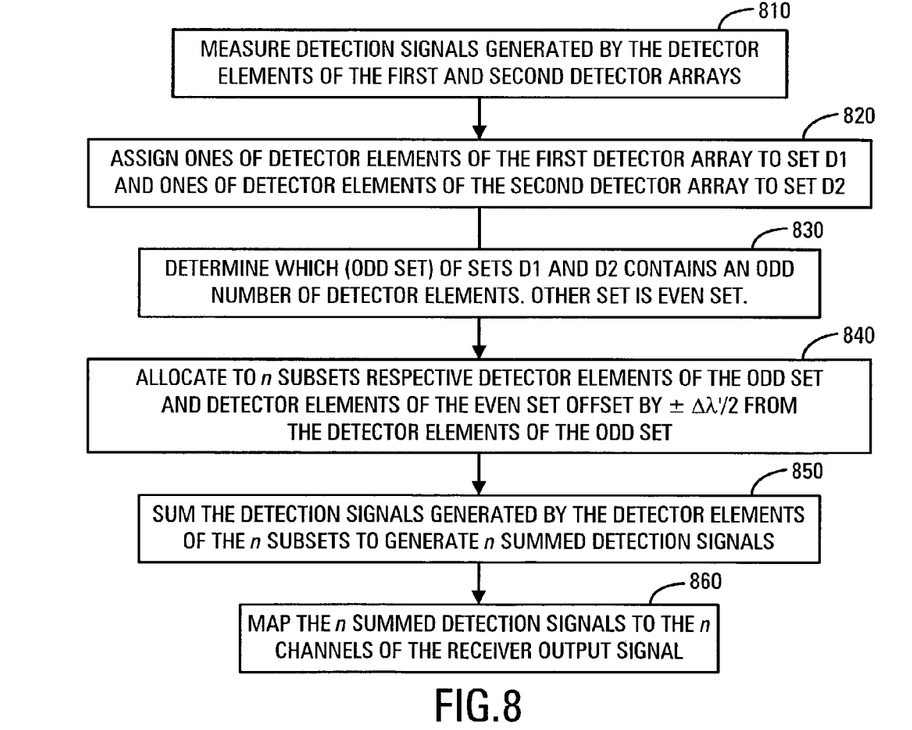
FIG. 8 is a flowchart that illustrates the signal extraction processing performed by a second example of the WDM receiver shown in FIG. 5.

FIG. 8 is a flowchart that illustrates the mapping algorithm performed by an example of the WDM receiver 300 show in FIG. 5 in which the wavelength spacing $\Delta\lambda'$ of the wavelength multiplexers 310 and 316 is one-half of the channel spacing $\Delta\lambda$ of the WDM optical input signal 314, i.e., $\Delta\lambda'=\Delta\lambda/2$.

In block 810, the detection signals generated by the detector elements of the first detector array 320 and the second detector array 324 are measured as described above with reference to Block 342 of FIG. 3.

In block 820, ones of the detector elements of the first detector array 320 are assigned to a set D1 and ones of the detector elements of the second detector array 324 are assigned to a set D2. The ones of the detector elements assigned to the sets are detector elements that (a) generate respective detection signals commensurate with illumination, or (b) do not generate respective detection signals commensurate with illumination, but are located in the respective detector array between two detector elements that generate respective detection signals commensurate with illumination. Detector elements that generate respective detection signals commensurate with illumination are described above with reference to block 342 of FIG. 3.

In block 830, a determination of which of the sets D1 and D2 contains an odd number of detector elements. This set will be referred to as an odd set. The other of the sets D1 and D2 contains an even number of detector elements and will be called an even set. Alternatively, a determination may be made of which of the sets contains an even number of detector elements. A determination of which of the sets contains an odd number of sets will be regarded as encompassing this alternative.

In block 840, the elements of the odd set and the even set are allocated to n subsets in which no more than one of the detector elements of the odd set that generates a detection signal commensurate with illumination is allocated to each subset. To each subset is additionally allocated the detector elements of the even set that are offset in wavelength by $\pm\Delta\lambda'/2$ relative to the detector element of the odd set allocated to the subset.

In block 850, the detection signals generated by the detector elements of the n subsets are summed to generate n summed detection signals.

In block 860, the n summed detection signals are mapped to the n channels of the receiver output signal 334.

Execution of the Mapping Algorithms

The mapping algorithms described above are executed at least once in certain applications and are executed multiple times in other applications. For applications in which the wavelengths of the optical signals that constitute the WDM optical input signal do not change, it is sufficient to execute the appropriate mapping algorithm only once when the WDM receiver is installed to determine the mapping of the detection signals to the receiver output signal. The receiver output signal is then continuously generated from the detection signals using the mapping determined by the algorithm. The mapping algorithm may be re-executed from time-to-time to track long-term changes in the optical communication system.

In applications in which the wavelengths of the WDM optical input vary with time, the above-described mapping algorithms are executed repetitively at a repetition frequency that is dependent on the maximum rate of change of the wavelengths of the optical signals that constitute the WDM optical input signal. In this manner, the WDM receiver can track the wavelength variations of the optical signals and change the manner in which the detection signals are mapped to the receiver output signal when such a change is necessitated by a change in the wavelength of one or more of the optical signals.

The WDM optical input signal 114 can be composed of, but is not limited to, optical signals having up to n wavelengths propagating in an optical waveguide such as an optical fiber, or in free-space.

The wavelength demultiplexers 110, 310, 316 can be implemented, for example, as a dielectric interference filter zig-zag demultiplexer, an arrayed waveguide grating demultiplexer (AWG), a diffraction grating demultiplexer, or a cascaded fiber Bragg grating demultiplexer.

The outputs of the wavelength demultiplexers 110, 310, 316 can be coupled to the detector elements of the detector arrays 120, 320, 324 by optical waveguides, such as optical fibers. Alternatively, the outputs of the wavelength demultiplexers can be directly coupled to the detector elements.

The detector arrays 120, 320, 324 can include monolithic PIN-detectors directly coupled to the respective wavelength demultiplexer 110, 310, 316, or can include individual fiber-coupled PINs, or avalanche photodiodes.

The detection signals (e.g., 124) can be in the form of photocurrents that are directly connected to signal extractor 130, 330 or can be amplified photocurrents that are connected to an external signal extractor. The signal extractor may be embodied in an integrated circuit. The detection signals may alternatively be in the form of digital signals that are connected to a signal extractor embodied in an application specific integrated circuit (ASIC), a digital signal processor (DSP) or a computer.

The signal extractor 130, 330 can be implemented in a single integrated circuit that combines pre-amplification with signal processing, a single integrated circuit that receives amplified detection signals and processes such signals, an application specific integrated circuit (ASIC), or computer system that processes digital detection signals.

The receiver output signal can be, for example, a multi-channel digital signal in which the channels correspond to individual channels of the WDM optical input signal.

The WDM receiver of the invention can be used for receiving guided transmission, e.g., transmission via an optical fiber, and for receiving free-space optical transmission. For free-space optical transmission, the WDM receiver of the invention may be made with multiple array elements that correspond to the multiple pixels in a free-space optical link.

This disclosure describes the invention in detail using illustrative embodiments. However, it is to be understood that the invention defined by the appended claims is not limited to the precise embodiments described.

We claim:

1. A wavelength division multiplexing (WDM) receiver for an n-channel optical input signal, the channels having a channel spacing of $\Delta\lambda$, the WDM receiver comprising:
   a wavelength demultiplexer receiving said n-channel optical input signal and transmitting said n-channel optical input signal to m optical outputs, each of said optical outputs receiving a wavelength band centered at a different wavelength, said wavelength bands having a center-to-center wavelength spacing of $\Delta\lambda'$;
   a detector array of m detector elements coupled to said wavelength demultiplexer, each of said detector elements generating a detection signal in response to light received from one of said optical outputs of said wavelength demultiplexer; and
   signal extractor means for receiving said detection signals from said detector array and for converting said detection signals to an n-channel receiver output signal, each of the n channels of said receiver output signal corresponding to a different one of the n channels of said optical input signal.

2. The WDM receiver of claim 1, in which ones of the channels of said optical input signal are occupied by optical signals having wavelengths that are constant with time.

3. The WDM receiver of claim 1, in which:
   said optical input signal has a channel spacing of $\Delta\lambda$;
   said wavelength spacing $\Delta\lambda'$ is equal to one-half of said channel spacing $\Delta\lambda$.

4. The WDM receiver of claim 3, wherein said signal extractor means is additionally for:
   measuring the detection signals generated by said detector elements;
   assigning to a set S1 ones of said detector elements that:
      (a) generate respective detection signals commensurate with illumination, or
      (b) do not generate respective detection signals commensurate with illumination but that are located in said detector array between two of said detector elements that generate respective detection signals commensurate with illumination;
   determining the parity of the number of said detector elements in said set S1;
   when said parity is odd, mapping the detection signals generated by alternate ones of the detector elements in said set S1 to the n channels of said receiver output signal; and
   when said parity is even, summing the detection signals generated by pairs of adjacent ones 2i−1 and 2i, where i=1 through n, of the detector elements of said set S1 to generate n summed detection signals and mapping said summed detection signals to the n channels of said receiver output signal.

5. The WDM receiver of claim 4, in which said signal extractor means is additionally for measuring the DC component of the detection signal generated by each one of said detector elements, the DC component representing the average optical power received by said one of said detector elements.

6. The WDM receiver of claim 1, in which:
   said optical input signal has a channel spacing of $\Delta\lambda$;
   said wavelength spacing $\Delta\lambda'$ is equal to one-third of said channel spacing $\Delta\lambda$.

7. The WDM receiver of claim 6, in which said signal extractor means is additionally for:
   measuring the detection signals generated by said detector elements;

assigning to a set S2 ones of said detector elements that generate respective detection signals commensurate with illumination;

allocating the detector elements of said set S2 to n subsets in which each of said detector elements is present in no more than one of said subsets and in which each of said subsets contains said one of the detector elements of said set S2 and all of the detector elements of said set S2, if any, adjacent said one of the detector elements;

summing the detection signals generated by the detector elements in said n subsets to generate n summed detection signals; and mapping said n summed detection signals to the n channels of said receiver output signal.

8. The WDM receiver of claim 7, in which the signal extractor means is additionally for measuring the DC component of the detection signal generated by each one of said detector elements, the DC component representing the average optical power received by said one of said detector elements.

9. The WDM receiver of claim 1 in which said wavelength demultiplexer comprises one of a dielectric interference filter zig-zag demultiplexer, an arrayed waveguide grating demultiplexer, a diffraction grating demultiplexer and a cascaded fiber Bragg grating demultiplexer.

10. The WDM receiver of claim 1, in which:

said wavelength demultiplexer is a first demultiplexer and detector array is a first detector array;

said WDM receiver additionally comprises an optical splitter arranged to receive said input optical signal and operating to split said input optical signal into a first optical input signal portion and a second optical input signal portion;

said first wavelength demultiplexer receives said first optical input signal portion and transmits said first optical input signal portion to said m optical outputs;

said WDM receiver additionally comprises:
  a second wavelength demultiplexer receiving said second optical input signal portion and transmitting said second optical input signal portion to m optical outputs, each of said optical outputs receiving a wavelength band centered at a different wavelength, said wavelength bands having a center-to-center wavelength spacing of $\Delta\lambda'$, each of said wavelength bands being offset in wavelength by 0.5 $\Delta\lambda'$ relative to the wavelength band of a corresponding one of said optical outputs of said first wavelength demultiplexer, and
  a second detector array of m detector elements coupled to said second wavelength demultiplexer, each of said detector elements generating a detection signal in response to light received from one of said optical outputs of said second wavelength demultiplexer; and said signal extractor means additionally receives said detection signals from said second wavelength demultiplexer and is for converting said detection signals received from said first detector array and said second detector array to said n-channel receiver output signal.

11. The WDM receiver of claim 10, in which ones of the channels of said optical input signal are occupied by optical signals having wavelengths that are constant with time.

12. The WDM receiver of claim 10, in which:

said optical input signal has a channel spacing of $\Delta\lambda$;

said wavelength spacing $\Delta\lambda'$ is equal to said channel spacing $\Delta\lambda$.

13. The WDM receiver of claim 12, in which said signal extractor means is additionally for:

measuring the detection signals generated by said detector elements;

assigning ones of the detector elements of said first detector array to a set A1 and ones of the detector elements of said second detector array to a set A2, said ones of the detector elements assigned to said sets generating respective detection signals commensurate with illumination;

determining whether only one of said sets A1 and A2 contains n of said detector elements;

when only one of said sets A1 and A2 contains n of said detector elements, mapping the n detection signals generated by the detector elements of said one of said sets containing said n detector elements to the n channels of said receiver output signal; and when both said sets A1 and A2 contain n of said detector elements, mapping the n detection signals generated by the detector elements of one of said sets to the n channels of said receiver output signal.

14. The WDM receiver of claim 13, in which, when both said sets A1 and A2 contain n of said detector elements, the n detection signals generated by the detector elements of the one of said sets having the larger sum of the detection signals are mapped to said n channels of the receiver output signal.

15. The WDM receiver of claim 13, in which the signal extractor means is additionally for measuring the DC component of the detection signal generated by each one of said detector elements, the DC component representing the average optical power received by said one of said detector elements.

16. The WDM receiver of claim 10, in which:

said optical input signal has a channel spacing of $\Delta\lambda$;

said wavelength spacing $\Delta\lambda'$ is equal to one-half of said channel spacing $\Delta\lambda$.

17. The WDM receiver of claim 16, in which said signal extractor means is additionally for:

measuring the detection signals generated by said detector elements;

assigning ones of the detector elements of said first detector array to a set D1 and ones of the detector elements of said second detector array to a set D2, said ones of the detector elements assigned to said sets being detector elements that:
  (a) generate respective detection signals commensurate with illumination, or
  (b) do not generate respective detection signals commensurate with illumination but that are located in the respective detector array between two of said detector elements that generate respective detection signals commensurate with illumination;

determining the parity of the number of the detector elements contained in at least one of said sets D1 and D2, a one of said sets in which said number has odd parity being an odd set, the other of said sets being an even set;

allocating said detector elements of said odd set and said even set to n subsets in which no more than one of said detector elements of said odd set that generates a detection signal commensurate with illumination is present in each of said subsets and each of said subsets additionally contains the detector elements of said even set offset in wavelength by $\pm\Delta\lambda'/2$ relative to said one of said detector elements of said odd set;

summing the detection signals generated by the detector elements of each of said n subsets to generate n summed detection signals; and mapping said n summed detection signals to the n channels of said receiver output signal.

18. The WDM receiver of claim 17, in which the signal extractor means is additionally for measuring the DC component of the detection signal generated by each one of said detector elements, the DC component representing the average optical power received by said one of said detector elements.

19. The WDM receiver of claim 10, in which said second wavelength demultiplexer comprises one of a dielectric interference filter zig-zag demultiplexer, an arrayed waveguide grating demultiplexer, a diffraction grating demultiplexer, and a cascaded fiber Bragg grating demultiplexer.

20. The WDM receiver of claim 10, in which said signal extractor means comprises one of an integrated circuit and a computer.

21. The WDM receiver of claim 1, in which m>n.

* * * * *